US012763613B2

(12) United States Patent
Agafonov et al.

(10) Patent No.: US 12,763,613 B2
(45) **Date of Patent: *Oct. 13, 2026**

(54) COMMUNICATION IN A WIRELESS POWER TRANSFER SYSTEM

(71) Applicant: KONINKLIJKE PHILIPS N.V., Eindhoven (NL)

(72) Inventors: Aleksei Agafonov, Eindhoven (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,204

(22) Filed: Mar. 3, 2025

(65) Prior Publication Data

US 2025/0202290 A1 Jun. 19, 2025

Related U.S. Application Data

(63) Continuation of application No. 18/288,203, filed as application No. PCT/EP2022/059596 on Apr. 11, 2022, now Pat. No. 12,278,504.

(30) Foreign Application Priority Data

Apr. 28, 2021 (EP) .................................... 21171008

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC ............. H02J 50/80; H02J 50/12; H02J 50/10
See application file for complete search history.

(56) References Cited

U.S. PATENT DOCUMENTS

| | | | | |
|---|---|---|---|---|
| 5,128,972 | A | 7/1992 | Horinouchi et al. | |
| 10,291,082 | B2 * | 5/2019 | Onishi | H02J 50/80 |

(Continued)

FOREIGN PATENT DOCUMENTS

| | | | |
|---|---|---|---|
| CN | 109905145 | A | 6/2019 |
| EP | 3381106 | A1 | 6/2017 |

(Continued)

OTHER PUBLICATIONS

International Search Report and Written Opinion from PCT/EP2022/059596 mailed Jul. 11, 2022.
QI Specification.

*Primary Examiner* — Daniel C Puentes
*Assistant Examiner* — Michael J Warmflash

(57) ABSTRACT

A power transfer system comprises a power transmitter (101) wirelessly providing power to a power receiver (105) via an inductive power transfer signal. Communication from power receiver (105) to the power transmitter (101) is by load modulation using the power transfer signal. The communication uses load modulation where each symbol is represented by a chip sequence being a sequence of modulation load values. The power transmitter (101) comprises a first communicator (207) which correlates a chip sequence received from the power receiver with a set of reference chip sequences being linked to data symbol values and determines the data symbol as the data symbol linked to a reference chip sequence for which the highest correlation with the first chip sequence is determined.

31 Claims, 8 Drawing Sheets

(56) References Cited

U.S. PATENT DOCUMENTS

| | | | | |
|---|---|---|---|---|
| 2006/0227857 | A1* | 10/2006 | Gaal | H04L 25/03159 375/150 |
| 2013/0035034 | A1* | 2/2013 | Kim | H04B 5/79 455/41.1 |
| 2013/0058380 | A1* | 3/2013 | Kim | H02J 50/80 455/434 |

FOREIGN PATENT DOCUMENTS

| | | | |
|---|---|---|---|
| EP | 3787151 | A1 | 3/2021 |
| JP | 2012060730 | A | 3/2012 |
| WO | 2006086437 | A1 | 8/2006 |
| WO | 2011120333 | A1 | 10/2011 |

* cited by examiner

COMMUNICATION IN A WIRELESS POWER TRANSFER SYSTEM

CROSS-REFERENCE TO PRIOR APPLICATIONS

This application is a continuation of U.S. patent application Ser. No. 18/288,203, filed on Oct. 23, 2025, which is the U.S. National Phase application under 35 U.S.C. § 371 of International Application No. PCT/EP2022/059596, filed on Apr. 11, 2022, which claims the benefit of EP Patent Application No. EP 21171008.2, filed on Apr. 28, 2021. These applications are hereby incorporated by reference herein.

FIELD OF THE INVENTION

The invention relates to wireless power transfer and in particular, but not exclusively, to wireless power transfer at higher power levels.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered. Examples of wireless power transfer systems may be found in EP 3 381 106A1, US 2013/058380, and WO2013/035034.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging. It has also been found in practice that load modulation may result in the introduction of undesired spurious oscillations to the drive signal and the power transfer signal. Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

Although it may in some ways be desired to change to a different communication approach maintaining backwards compatibility or reducing the amount of change needed for existing designs and approaches is a prime challenge that often renders this unattractive.

Hence, an improved approach would be advantageous, in particular, an approach allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: an output circuit comprising a transmitter coil arranged to generate the power transfer signal in response to a drive signal being applied to the output circuit; a driver arranged to generate the drive signal; a first communicator arranged to receive symbols transmitted from the power receiver by load modulation of the power transfer signal, each symbol being represented by a chip sequence being a sequence of modulation load values and being synchronized with the power transfer signal; the first communicator comprising: a store arranged to store a set of reference chip sequences, each reference chip sequence being linked with a data symbol; a correlator arranged to correlate a first chip sequence received from the power receiver with the set of reference chip sequences; a demodulator arranged to determine a received data symbol as the data symbol linked to a reference chip sequence for which a highest correlation with the first chip sequence is determined; and wherein the first communicator is arranged to synchronize the sampling of the signal of the output circuit to the power transfer signal.

The invention may provide improved performance in many embodiments and may in particular in many embodiments provide improved communication between a power receiver and a power transmitter. It may provide improved power transfer in many embodiments.

The approach may allow improved communication and in many embodiments improved trade-off between different parameters and operating characteristics. The approach may e.g. allow highly reliable communication yet allow reduced modulation depth to be used. The approach may reduce electric noise and/or electromagnetic interference and provide improved electromagnetic compatibility. The approach may in many cases reduce or prevent acoustic noise. Further, the approach may provide advantageous backwards compatibility and e.g. may allow relatively easy modification of existing approaches, such as those used by the Qi Specifications. The approach may reuse much functionality from such existing approaches. The approach may allow for low complexity implementation yet provide highly efficient performance. The communication approach may be particularly advantageous for use in power transfer systems as bandwidth considerations may be less critical in such systems.

In some embodiments, the power transmitter may be arranged to initiate communication with the power receiver using a default chip frequency for the load modulation and to change the chip frequency in response to a message received from the power receiver.

A chip sequence may be a sequence/pattern of modulation load values. Each of these modulation load values may be constant within a chip duration. Chip sequences for different data symbols have different sequences/patterns of modulation load values.

In many embodiments, the length of chip sequences of the set of reference chip sequences is not below 10 and not above 1024 chips.

In accordance with an optional feature of the invention, the first communicator comprises a sampler arranged to sample a signal of the output circuit and the correlator is arranged to determine sample modulation load values from samples of the signal and to determine correlation values for the set of reference chip sequences by correlating sample modulation load values to the reference chip sequences of the set of reference chip sequences.

This may provide improved performance and/or operation in many embodiments. It may in particular in many embodiments provide efficient and low complexity operation.

In accordance with an optional feature of the invention, the first communicator is arranged to synchronize the sampling of the signal of the output circuit to the power transfer signal.

This may provide improved performance and/or operation in many embodiments, and may allow efficient implementation. In many embodiments, it may allow improved and/or facilitated determination of received modulation load values.

In some embodiments, the first communicator is arranged to synchronize the sampling of the signal of the output circuit to the drive signal.

In accordance with an optional feature of the invention, a sampling rate of the sampling of the signal of the output circuit is equal to a chip frequency of the load modulation.

This may provide improved performance and/or operation in many embodiments, and may in particular typically allow an increased data rate while still allowing reliable communication and modulation load detection.

In accordance with an optional feature of the invention, an operating frequency of the power transfer signal is an integer multiple of a sampling rate of the sampling of the signal of the output circuit.

This may provide improved performance and/or operation in many embodiments, and may allow efficient implementation. The integer multiple may often not exceed 1, 2, 5, 10, or 50.

In accordance with an optional feature of the invention, an operating frequency of the power transfer signal is an integer multiple of a chip frequency of the load modulation.

This may provide improved performance and/or operation in many embodiments, and may allow efficient implementation. The integer multiple may often not exceed 1, 2, 5, 10, or 50.

In accordance with an optional feature of the invention, the power transmitter further comprises a second a communicator arranged to receive symbols transmitted from the power receiver by load modulation of the power transfer signal with a first binary symbol value being represented by no modulation load transition occurring within a symbol time and a second binary symbol value being represented by a single modulation load transition occurring within the symbol time; and wherein the power transmitter is arranged to initiate communication with the power receiver using the second communicator and to switch to the first communicator in response to receiving a confirmation message from the power receiver, the confirmation message confirming a capability of the power receiver to communicate symbols by load modulation where each symbol is represented by a chip sequence.

This may provide improved performance and/or operation in many embodiments. It may in particular in many scenarios provide improved backwards compatibility and/or facilitate the introduction of chip sequence based communication.

In accordance with an optional feature of the invention, the power transmitter further comprises a second communicator arranged to receive symbols transmitted from the power receiver by load modulation of the power transfer signal with a first binary symbol value being represented by no modulation load transition occurring within a symbol time and a second binary symbol value being represented by a single modulation load transition occurring within the symbol time; and wherein the power transmitter is arranged to initiate communication with the power receiver using the first communicator and to switch to communication with the power receiver using the second communicator in the absence of receiving a confirmation message from the power receiver using the first communicator.

This may provide improved performance and/or operation in many embodiments. It may in particular in many scenarios provide improved backwards compatibility and/or facilitate the introduction of chip sequence based communication.

In accordance with an optional feature of the invention, the power transmitter further comprises a second communicator arranged to receive symbols transmitted from the power receiver by load modulation of the power transfer signal with a first binary symbol value being represented by no modulation load transition occurring within a symbol time and a second binary symbol value being represented by a single modulation load transition occurring within the symbol time; and wherein the power transmitter is arranged to perform parallel communication with the power receiver using both the first communicator and the second communicator.

This may provide improved performance and/or operation in many embodiments. It may in particular in many scenarios provide improved backwards compatibility and/or facilitate the introduction of chip sequence based communication.

In accordance with an optional feature of the invention, the set of reference chip sequences comprises more than two reference chip sequences.

This may provide particularly advantageous operation and/or performance in many embodiments. It may specifically allow higher order symbols to be communicated thereby potentially substantially increasing the bit rate that can be achieved.

According to an aspect of the invention there is provided a power receiver for wirelessly receiving power from a power transmitter via an inductive power transfer signal; the power receiver comprising: an input circuit comprising a receiver coil arranged to extract power from the power transfer signal; and a communicator arranged to transmit symbols to the power transmitter by load modulation of the power transfer signal, each symbol being represented by a chip sequence being a sequence of modulation load values; the communicator comprising: a receiver arranged to receive a first data symbol to be transmitted; a determiner arranged to determine a first chip sequence assigned for the first data symbol; a load modulator arranged to load modulate the first chip sequence on the power transfer signal; and wherein the communicator is arranged to synchronize the load modulation of the first chip sequence to the power transfer signal.

In some embodiments, the power receiver may comprise a second power receiver communicator arranged to transmit symbols to the power transmitter by load modulation of the power transfer signal with a first binary symbol value being represented by no modulation load transition occurring within a symbol time and a second binary symbol value being represented by a single modulation load transition occurring within a symbol time.

In some embodiments, the power receiver is arranged to initiate communication with the power transmitter using the second power receiver communicator and to switch to the first power receiver communicator in response to receiving a confirmation message from the power transmitter, the confirmation message confirming a capability of the power transmitter to communicate symbols by load modulation where each symbol is represented by a chip sequence.

In some embodiments, the power receiver is arranged to communicate initiate communication with the power transmitter using the first power receiver communicator and to switch to communication with the power transmitter using the second power receiver communicator in the absence of receiving a confirmation message from the power transmitter using the first power receiver communicator.

In some embodiments, the power receiver is arranged to perform parallel communication with the power transmitter using both the first power receiver communicator and the second power receiver communicator.

According to an aspect of the invention there is provided a method of operation for a power transmitter for wirelessly providing power to a power receiver via an inductive power transfer signal; the power transmitter comprising: an output circuit comprising a transmitter coil arranged to generate the power transfer signal in response to a drive signal being applied to the output circuit; and a first communicator arranged to receive symbols transmitted from the power receiver by load modulation of the power transfer signal, each symbol being represented by a chip sequence being a sequence of modulation load values and being synchronized with the power transfer signal; the method comprising: generating the drive signal; storing a set of reference chip sequences, each reference chip sequence being linked with a data symbol; correlating a first chip sequence received from the power receiver with the set of reference chip sequences; determining a received data symbol as the data symbol linked to a reference chip sequence for which a highest correlation with the first chip sequence is determined; and synchronizing the sampling of the signal of the output circuit (203, 103) to the power transfer signal.

According to an aspect of the invention there is provided a method of operation for a power receiver for wirelessly receiving power from a power transmitter via an inductive power transfer signal; the power receiver comprising: an input circuit comprising a receiver coil arranged to extract power from the power transfer signal; and a communicator arranged to transmit symbols to the power transmitter by load modulation of the power transfer signal, each symbol being represented by a chip sequence being a sequence of modulation load values; the method comprising: receiving a first data symbol to be transmitted; determining a first chip sequence assigned for the first data symbol; load modulating the first chip sequence on the power transfer signal and synchronizing the load modulation of the first chip sequence to the power transfer signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a high power wireless power transfer system utilizing a power transfer approach such as known from the Qi Specification. However, it will be appreciated that the invention is not limited to this application but may be applied to many other wireless power transfer systems.

Figure 1:
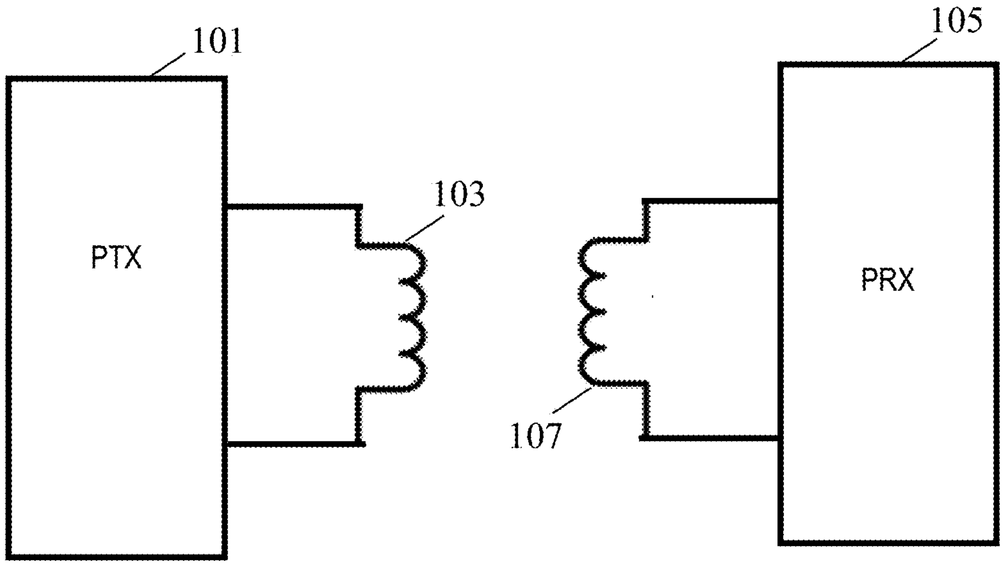
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi Specifications (except for the herein described (or consequential) modifications and enhancements). Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
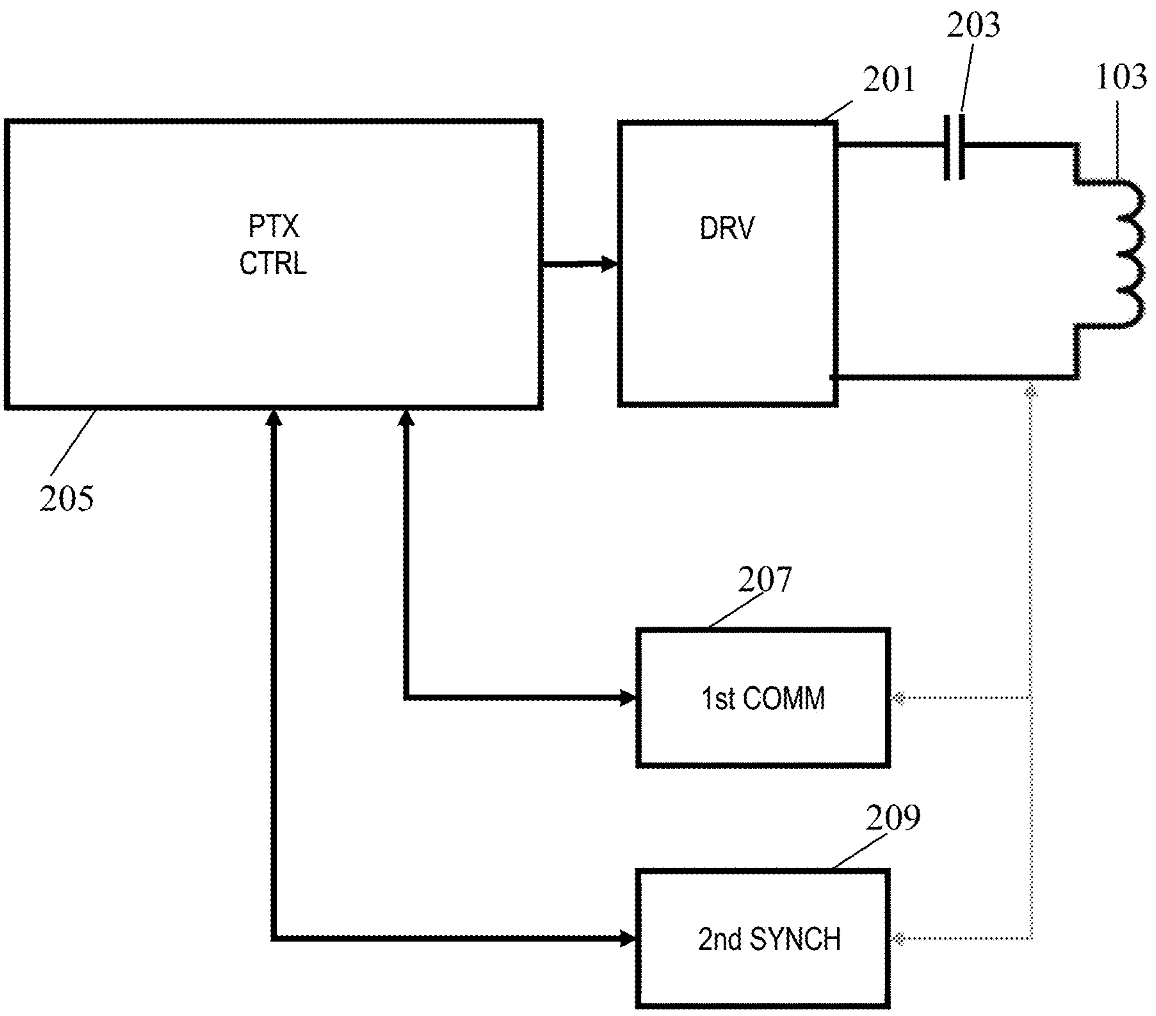
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
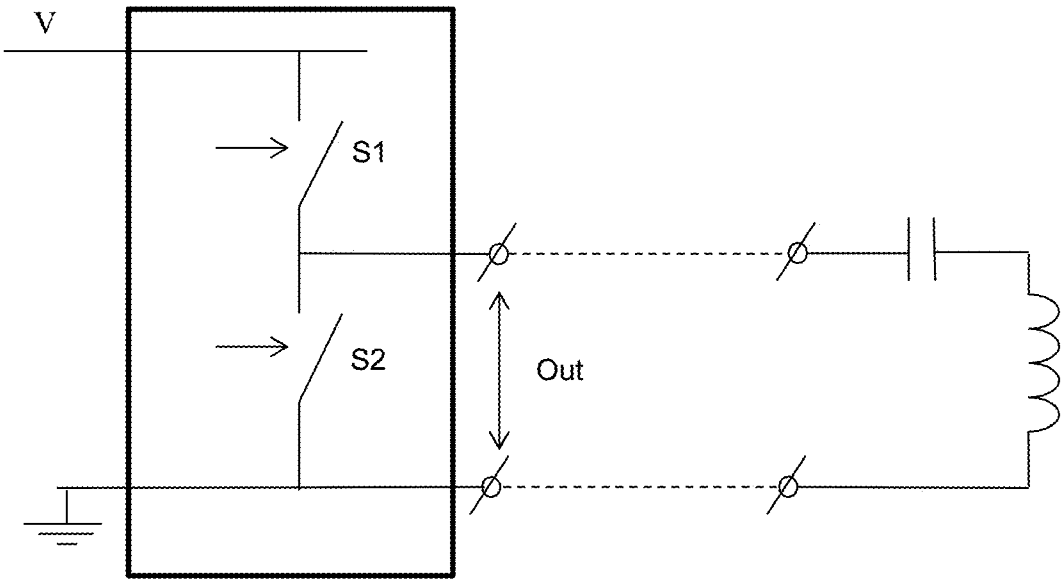
FIG. 3 illustrates an example of a half bridge inverter for a power transmitter.
Figure 4:
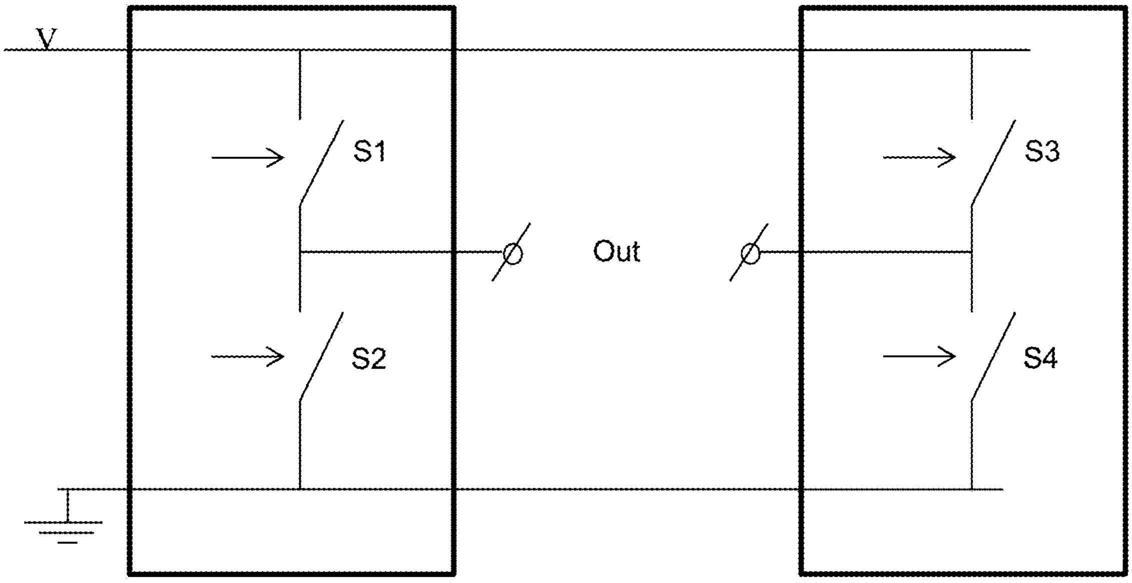
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

In order to communicate with the power receiver the power transmitter 101 further comprises a first communicator 207 which is arranged to communicate with a complementary communicator of a power receiver. The first communicator 207 is specifically arranged to communicate with the (complementary communicator of the) power receiver using the power transfer signal as a communication carrier. In particular, communication from the power transmitter to the power receiver may be by frequency, phase and/or amplitude modulation of the power transfer signal. The power receiver may evaluate the signal induced in the receiver coil 107 (from the power transfer signal) and demodulate this according to the modulation used thereby extracting data transmitted in the forward direction (from power transmitter to power receiver).

In the reverse direction from the power receiver to the power transmitter, the power receiver may load modulate the power transfer signal to communicate data to the power transmitter.

As will be well known to the skilled person, for load modulation, a loading change of the power transfer signal by the power receiver can be detected by the first communicator 207 and the power receiver may change the loading in accordance with data values to be transmitted.

Load modulation is the method for the power receiver to communicate control messages or other data to the power transmitter in Qi wireless power standard. There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal, and detection approaches as known for Qi may be used to detect the load variations at the power transmitter side. For example, a direct measurement of a power level or current amplitude of the drive signal may be used as indications of the loading, and thus load modulation variations, by the power receiver as will be known to the skilled person.

Figure 5:
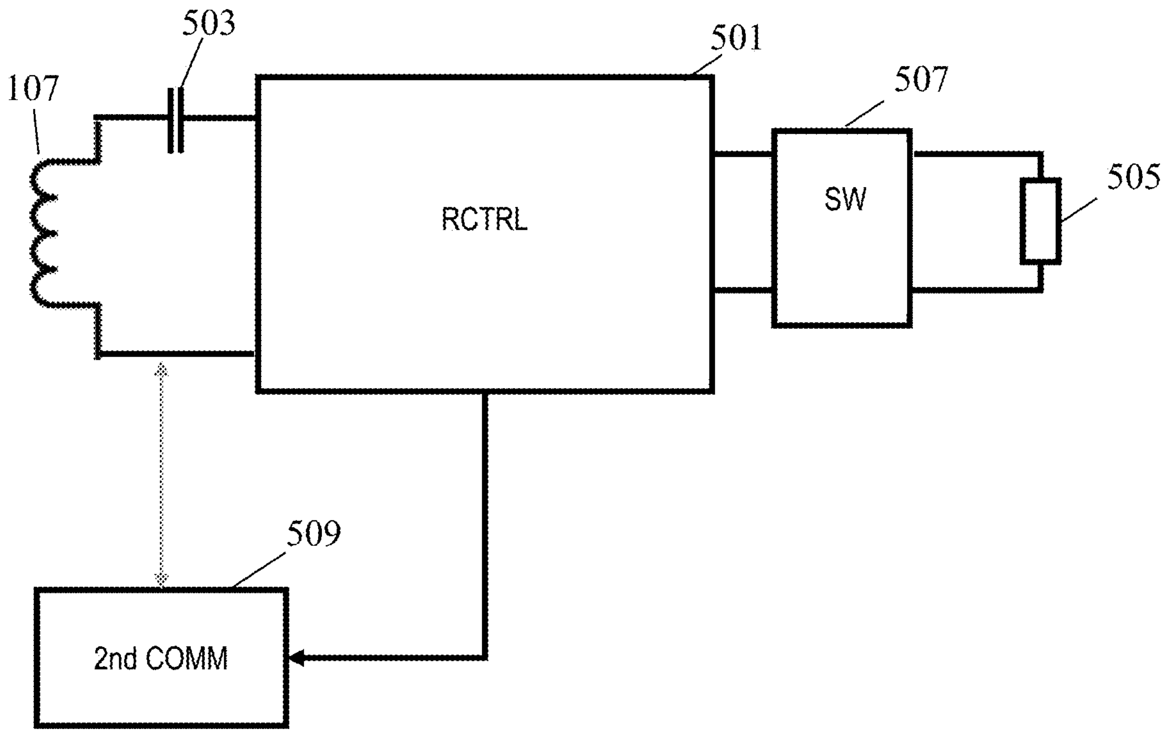
FIG. 5 illustrates an example of elements of a power receiver in accordance with some embodiments of the invention.

FIG. 5 illustrates some exemplary elements of the power receiver 105.

In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi Specifications.

The power receiver controller 501 further comprises a first power receiver communicator 509 which is arranged to communicate data with the power transmitter. The first power receiver communicator 509 is the complementary communicator to the first communicator 207 and is specifically arranged to receive data that has been amplitude, phase, and/or frequency modulated onto the power transfer signal. It is also arranged to transmit data to the power transmitter by load modulating the power transfer signal. For example, the first power receiver communicator 509 may be arranged to switch in/out a communication capacitor e.g. positioned in parallel with the power receiver controller 501 or with the resonance capacitor 503 thereby being able to vary the resonance frequency and the loading of the power transfer signal.

The first power receiver communicator 509 may be coupled to the power receiver controller 501 and be arranged to provide received data to the power receiver controller 501 for processing, and to receive data from the power receiver controller 501 for transmission to the power transmitter. For example, the first power receiver may receive power error control data from the power receiver controller 501 and may transmit corresponding power error control messages to the power transmitter using load modulation.

In operation, the system is arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. In some embodiments, a direct power setpoint change message may be transmitted indicating a desired absolute power level (rather than a relative error message). The power receiver 105 comprises functionality for supporting such a power control loop, e.g. the power receiver controller 501 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter. Such error control messages, as well as other messages, may be transmitted by load modulation.

Load modulation may provide advantageous operation in many systems and applications and tends to provide reliable and low complexity operation suitable for power transfer systems where a power transfer signal is generated for the purpose of transferring power. The reuse of the power transfer signal as a communication carrier may typically reduce complexity and require less circuitry thereby reducing cost.

However, load modulation as used in e.g. Qi also has some associated disadvantages. Such disadvantages may e.g. be related to issues such as electromagnetic compatibility, communication quality (bit error rate), and audible noise.

The load modulation may create additional components in the electromagnetic spectrum causing additional electromagnetic interference and electrical noise. Also, it has been found that in many cases, the changes to the electromagnetic field caused by the load modulation may cause mechanical forces and movement that result in audible noise. It has also been found that strong load modulation may disturb the energy balance in the wireless power system, resulting in spurious oscillations within the communication carrier spectrum. In the presence of spurious oscillations, the wireless power transmitter often cannot properly demodulate the signal and therefore it has to interrupt power delivery to maintain safe operations.

The problems tend to be exacerbated for higher power transfer levels. Indeed, as the power levels of the power transfer signal increase, it is typically required that the load change for load modulation increases as well. Typically, the load modulation is required to be a suitable fraction of the power level, or maximum power level, of the power transfer signal. For example, the load modulation caused by the load modulation may be required to have a magnitude of no less than e.g. about 1% of the general loading of the power receiver (i.e. the load variation for the receiver coil caused by the load modulation may be required to be no less than 1% of the total load of the receiver coil 107). Qi was originally introduced for lower power applications of less than 5 W or so. For such lower power levels, the impact of the load modulation disadvantages is relatively manageable or even substantially insignificant. However, the maximum power levels for Qi have been increased to currently a maximum value of 15 W and work is ongoing to increase this further to a maximum level of 45 W. However, for such power levels, the above mentioned disadvantages tend to be significant, and they may provide a major obstacle to the further development of the Qi Specifications.

The system of FIGS. 1, 2, and 5 utilize an approach which in many situations may address one or more of the issues associated with load modulation. In the approach, load modulation is employed, but each symbol is represented by a chip sequence comprising a plurality of chips, and typically with a sequence comprising 10 to 1023 chips. Thus, rather than simply varying the load in accordance with each symbol or bit, the first power receiver communicator 509 is arranged to transmit a given symbol (typically bit) by a series of load changes and variations where the changes and variations are different for each symbol. Specifically, a chip sequence may be defined for each symbol and when transmitting a given symbol, the first power receiver communicator 509 may retrieve the chip sequence for that specific symbol and proceed to load modulate the power transfer signal in accordance with the chip sequence for the symbol.

Similarly, the first communicator 207 may detect the load modulation by considering the whole sequence, and specifically may seek to determine the receive symbol as the one for which the detected load variation pattern most closely matches the chip sequence pattern for that symbol.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

Figure 6:
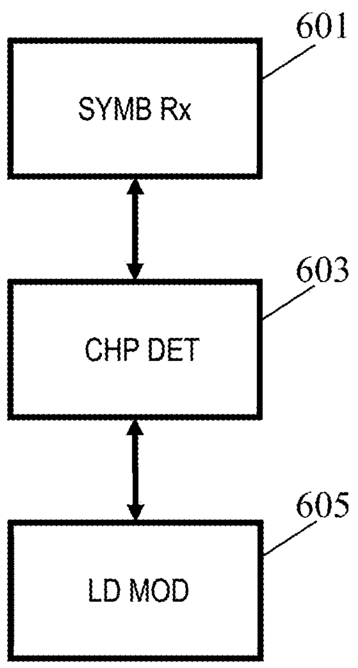
FIG. 6 illustrates an example of elements of a communicator for a power transmitter in accordance with some embodiments of the invention.

FIG. 6 illustrates an example of some elements of the first power receiver communicator 509. The first power receiver communicator 509 specifically comprises a symbol receiver 601 which is arranged to receive data symbols to be transmitted to the power transmitter. For example, error control data symbols for transmission to the power transmitter may be received. Typically, the data symbols may be binary but in some cases higher order modulation symbols may be used (i.e. with more than two possible values). In some cases, such higher order data symbols may correspond to a combination of received data bits. For example, two bits may be combined into a single quaternary data symbol. Such combination may be possible both when the data bits are related and when they are e.g. completely independent.

Figure 7:
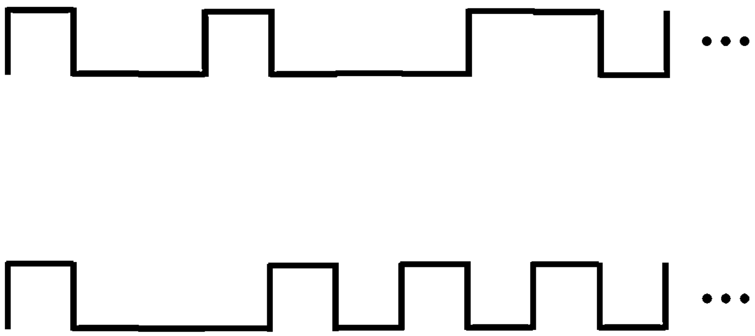
FIG. 7 illustrates an example of chip sequences.

The symbol receiver 601 is coupled to a chip determiner 603 which is arranged to determine a chip sequence assigned for the received data symbol. Specifically, the chip determiner 603 comprises a store which stores a set of reference chip sequences where each reference chip sequence is linked to a specific data symbol value. FIG. 7 illustrates an example of parts of two possible chip sequences. Each chip sequence comprises a sequence of chips with each chip having constant modulation load level selected from a set of modulation levels. Typically, the set of modulation levels is two, corresponding to a binary chip sequence where the modulation load levels may switch between two possible levels. A symbol time is thus divided into a plurality of chip intervals with the modulation load level for each chip interval being selected from a predetermined set of modulation load levels and with the modulation load level sequences of the chips being different for different chip sequences. Typically, each sequence includes at least ten chips, and often substantially more. In many embodiments, each chip sequence may have a length of $2^N-1$ where N is an integer of typically no less than 4.

Each of the stored chip sequences is assigned to one symbol. Thus, each possible data symbol value that may need to be transmitted to the power transmitter may have a linked/associated chip sequence. For example, where only two data symbols are possible, i.e. where a binary communication is implemented, the set of chip sequences may comprise only two chip sequences.

When the power receiver is about to transmit a data symbol, the value is fed to the symbol receiver 601 from the power receiver controller 501 and then to the chip determiner 603 which proceeds to determine the chip sequence that is linked to the data value to be transmitted.

The determined chip sequence is then fed to a load modulator 605 which is arranged to modulate the first chip sequence on the power transfer signal. Specifically, a modulation load may be switched in and out (on/off) in line with the chips, i.e. the load may be changed in accordance with the modulation load values of the chip sequence.

Thus, in the example, each symbol (typically bit) time interval is divided into a plurality (of typically at least 10) chip intervals with the modulation load being constant within each chip interval and with the modulation loads varying (changing or not changing) between chip intervals in accordance with a pattern which is different for each chip sequence.

Figure 8:
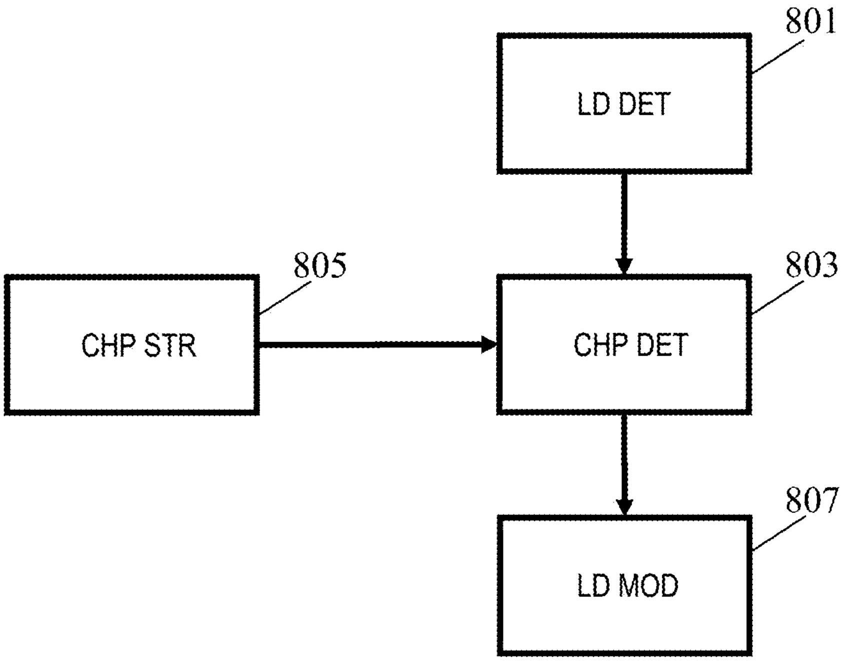
FIG. 8 illustrates an example of elements of a communicator for a power receiver in accordance with some embodiments of the invention.

FIG. 8 illustrates example of elements of the first communicator 207. The first communicator 207 may comprise a load detector 801 which is arranged to detect load variations of the power transfer signal to determine a load variation sequence of the power transfer signal and/or drive signal. The load variation sequence thus corresponds to the received chip sequence. For example, the load value of the drive signal (e.g. the current and/or power) may be measured and sampled at time intervals corresponding to the chip intervals during a time when a message is (expected to be) received from the power receiver. In some cases, the values may be normalized and quantized, e.g. if binary chip sequences are used, the load detector may generate a sequence of binary values e.g. representing a higher load and a lower load. Thus a received chip sequence of load modulation is generated from the sampling of the signal(s) of the output circuit.

The load detector 801 provides the received chip sequence of modulation load values to a chip detector 803 which is further coupled to a chip sequence store 805. The chip sequence store 805 stores a set of reference chip sequences which specifically correspond to the chip sequences stored and used by the power receiver. Thus, the first communicator 207 comprises a local representation of the chip sequences used by the power receiver. The chip store 805 comprises a set of reference chip sequences with each reference chip sequence being linked to a specific data symbol. Thus, the power receiver and the power transmitter comprise corresponding links between reference chip sequences and data symbols.

The chip detector 803 is arranged to correlate the received chip sequence with each of the reference chip sequences and it can determine a correlation value indicating how closely the receive chip sequence matches each of the stored reference sequences.

The correlation values and the associated symbols are fed to a demodulator 807 that is arranged to determine the received data symbol as the data symbol which has the highest correlation with the received chip sequence.

Thus, the power receiver is capable of transmitting data to the power transmitter using load modulation but using typically long chip sequences for each data symbol. The approach may provide a substantially improved communication and operation in many embodiments. In particular, a substantially improved communication performance and reliability, and especially the symbol signal to noise ratio may be increased substantially. This may allow the modulation depth, and specifically the modulation load variations relative to the power transfer signal level/power transfer level, to be reduced substantially. Indeed, in many cases, the modulation depth may be reduced by a factor of 10, 100, or even higher. This may reduce and mitigate many of the disadvantages of using load modulation and may e.g. reduce electromagnetic interference, reduce electrical noise, reduce mechanical noise, prevent or mitigate spurious oscillations etc.

For example, using a chip rate corresponding to the bit rate used in Qi, which may be up to 2 kBps communication rate, the improvement in signal to noise ratio may be increased by an amount corresponding to the sequence length. For example, using bit lengths of 63 or 127 may increase the symbol energy to noise ratio by a corresponding amount allowing the modulation depth to correspondingly be reduced by a factor of 63 or 127 while maintaining the same bit error rate.

A disadvantage of such an approach may be that the effective communication rate may be reduced. For example, the use of sequence lengths of 63 or 127 may reduce the effective baud rate to 30.7 or 15.7 bps, respectively. In order to address this, the chip time interval duration may be reduced. The reduction may be a suitable trade-off between desired communication rate and bit error performance and can be selected for the specific application and implementation. Increasing the chip rate may have the effect that the required bandwidth and frequency spectrum of the load modulation may increase correspondingly, and potentially by a high amount. However, it is a particular advantage of the current approach that communication in a wireless power transfer system is typically not bandwidth restricted or even sensitive to the bandwidth of the communication and thus such an additional bandwidth may typically be available without impacting other functionality or performance.

In many embodiments, the system may be arranged to synchronize the load modulation communication to the power transfer signal.

In many embodiments, the first power receiver communicator 509 may specifically be arranged to synchronize the load modulation of the first chip sequence to the power transfer signal. The power transfer signal has an operating frequency which is typically in the range of 10 KHz-500 KHz and for Qi is often around 100 kHz. The first power receiver communicator 509 may synchronize the chip time intervals to be synchronized to the oscillations and periods of the power transfer signal. For example, in many embodiments, the first power receiver communicator 509 may use a chip duration/time interval which is a multiple of the power transfer signal period. Thus, each chip may have a duration that is a multiple of the period time of the power transfer signal, i.e. the duration of the chip interval may be N*T where N is an integer and T is the duration of a period of the power transfer signal/drive signal.

In many embodiments, the first power receiver communicator 509 may not only synchronize the duration of the chip intervals to the durations of the periods of the power transfer signal but may also time the start and/or stop timings of the chips to the timing of the power transfer signal. Specifically, the transition times between chips may be synchronized to occur at zero crossings of the power transfer signal, or e.g. with a fixed offset relative to zero crossings of the power transfer signal. It will be appreciated that the synchronization may be based on the timing of the signal inducted in the receiver coil 107 by the power transfer signal.

Similarly, the first power receiver communicator 509 may be arranged to generate the received chip sequence from samples of the loading of the power transfer signal (possible after matched filtering being applied).

The load detector 801 may specifically sample a signal of the output circuit that corresponds to the power transfer signal, such as a current and/or power of the drive signal, a relative phase between current and voltage of the drive signal, a current through the transmitter coil 103 etc. The correlator may then generate the chip sequence to correspond to the load values for these sampling times, and may proceed to determine the correlation values by correlating the received chip sequence in the form of the sampled modulation load values with the reference values.

It will be appreciated that in some approaches, the correlation may be based on hard-decision values, i.e. a direct comparison of the chip values with hard decision received chip values may be used. In some embodiments, the decisions may for example be based on soft decision modulation load/chip values. For example, for a binary transmission approach, the reference chip sequences may be binary sequences comprising only two possible values. However, the received chip sequences may be represented by soft decision values, such as values directly indicating a measured modulation load values.

In many embodiments, the load detector 803 may be arranged to synchronize the sampling to the power transfer signal, and specifically this may be achieved by synchronizing it to the drive signal.

In many embodiments, the synchronization may be of the sampling such that e.g. one sample is made per chip (possibly after matched filtering). Especially, if the chip rate is equal to N times the period of the power transfer signal, the sampling may also be synchronized to be once every N times. Thus, in many embodiments, the synchronization may be such that the sampling rate is equal to the chip frequency of the load modulation.

In some embodiments, the sampling may be a two stage process where a number of samples are generated at a higher frequency and then decimated to given sample rate. For example, for a chip duration of ten times the period of the power transfer signal, the sampler may take one sample every period. An averaging filter may then add the last ten samples, i.e. it may be a square window FIR filter that sums the ten most recent samples (with equal weights). The output of the sampling may then be the sampled output of this filter, such as specifically the output of every tenth period which coincides with the filter being a summation of the ten periods falling within a single chip. Thus, effectively the sampling at the synchronized time instants may be achieved by a suitably synchronized decimation at the output of the filter.

In other embodiments, only a single sampling of the analog signal of the output circuit is performed per chip. In such a situation the timing of the sampling may for each sample be synchronized to occur in the center of the symbol duration.

In many embodiments, the operating frequency of the drive signal and the power transfer signal may thus be an integer multiple of the sampling rate of the sampling of the signal of the output circuit and/or an integer multiple of a chip frequency of the load modulation. The multiple may be the same and may specifically be one. Indeed, in many embodiments, the integer multiple is advantageously relatively low in order to allow efficient communication and a higher data rate. In many embodiments, the integer advantageously does not exceed 1, 3, 5, 10, or 20.

Synchronization of the load modulation to the power transfer signal may in many practical implementations allow an increase of the chip rate and/or bit rate because it enables a reduction of the amount of sampling the power transmitter has to perform. In the extreme case where the chip frequency is the same as the power transfer signal frequency, the power receiver may change the load according to the chip sequence every cycle of the power transfer signal. Alternatively, the power receiver might change the load according to the chip sequence every N-th cycle of the power signal, reducing the chip frequency by a factor N.

Synchronous modulation cases modulation detection at the power transmitter side by enabling this to apply a synchronous sampling technique and correlating the detected signal to the modulation sequence after that step. The approach may typically facilitate implementation substantially while achieving an efficient communication.

The length of the chip sequences may be selected to the specific preferences and requirements of the individual embodiment and may be selected to provide a suitable compromise between communication reliability and performance (e.g. bit rate), data rate, bandwidth, modulation depth and associated disadvantages etc. In most embodiments, a length of no less than 10 and/or no more than 1024 chips will provide suitable and advantageous performance for wireless power transfer systems, such as specifically for Qi systems.

In many embodiments, the set of chip sequences may include only two chip sequences. In such examples, each symbol may be represented by one or the other chip sequence depending on the symbol value and thus each symbol may be a binary symbol (bit) and the communication may be a binary communication.

In some embodiments, the set of chip sequences may include more than two chip sequences and more than two different symbol values are possible. For example, in some embodiments, the set of chip sequences may comprise, say, three chip sequences allowing three different symbol values for each symbol being communicated by a chip sequence. In other embodiments, a larger number of sequences may be included allowing each chip sequence/data symbol to represent more data values thereby increasing the effective bit rate. Such an approach may in particular be suitable for longer chip sequences where larger differences in correlation values between chip sequences are feasible.

For example, for a chip length of 10 bits, 256 different sequences are possible, and the system may select two sequences out of these that have high autocorrelation and low cross-correlation. The two sequences may then be used for binary communication allowing high reliability as the correlation performed by the first communicator 207 will generate substantially different correlation values for the two possible chip sequences being received. For a length of 16 chips, 65384 different sequences are possible, and the system may e.g. select four sequences with high autocorrelation and low cross-correlation. This may allow each symbol to communicate two bits.

The specific sequences and patterns used may depend on the preferences and requirements of the individual embodiment. Typically, the sequences are selected to provide good correlation properties, and specifically the set of chip sequences is selected to consists of sequences with high autocorrelation values and low cross-correlation values. In many embodiments, chip sequences may be selected as maximum length sequences. For example, in many embodiments, chip sequences may be selected as maximum length sequences generated from polynomial the polynomial order chosen by the power receiver in accordance with a desired/selected modulation depth and desired communication speed. Specifically, pseudo noise sequences developed for, and used in, direct sequence spread spectrum communication and code division multiple access systems may tend to also be suitable for the described approach.

It will be appreciated that in many embodiments, the set of sequences may comprise mirror image or inverted chip sequences, i.e. for a given binary chip sequence, the set of chip sequences may also include the chip sequence for which all chips have the complementary value. For example, if the load values are represented by 1 and −1, the set of chip sequences may for each chip sequence also include the chip sequence resulting from a multiplication by −1 (equivalent to swapping between 0 and 1 for all chips for a chip sequence represented by the values of 1 and 0). Indeed, in some embodiments, the set of chip sequences may comprise only a chip sequence and the inverted chip sequence. It will be appreciated that in such embodiments, only a single representation needs to be stored to represent a pair of a chip sequence and the inverted chip sequence.

Such an approach may be particularly suitable for many applications and may result in good performance and low complexity. For example, a single correlation between a received chip sequence and a reference chip sequence can provide a correlation value for both the reference chip sequence and for the inverse chip sequence. Indeed, if there is no noise, the correlation value for one of the reference chip sequences may be +1 and the correlation value for the inverse reference chip sequence will then by −1. Thus, a single correlation value applicable to two symbol values/sequences can be determined and directly be used to select between the two symbols.

It will be appreciated that the approach of using inverted reference chip sequences can be considered equal to a multiplication of the binary data symbol and a single reference chip sequence (using the values of 1 and −1 to represent the binary values).

As a specific example, the system may employ the following approach:

1. The power receiver reduces the depth of load modulation significantly so that spurious oscillations do not occur, electrical and acoustic noise is reduced etc.
2. The power receiver encodes individual bits as direct (e.g., pseudorandom) chip sequences with steep autocorrelation functions.
3. The power receiver manipulates the load (typically changes the load or detunes the resonance circuit) synchronously with the power transfer signal (e.g., a transition per power signal cycle or a transition every multiple power signal cycles).
4. The power transmitter measures the load changes, e.g., by measuring the transmitter coil voltage or coil current, with a sampling time that is synchronized to the power transfer signal (e.g., one sample per power signal cycle, multiple samples per power signal cycle, or one sample per multiple power signal cycles).
5. The power transmitter decodes the data by correlating the digitized samples with the chip sequence according to which the data was modulated.
6. The chip sequence and the number of power signal cycles per symbol may be known by the power receiver and the power transmitter a priori.

An advantage of the described approach is that it provides improved backwards compatibility in many scenarios and require relatively little modifications to many power transfer systems. For example, a Qi power transfer system already uses load modulation and relatively little modification may be required to support the approach described hereinabove.

Further, in many embodiments, functionality may be included that further improves backwards compatibility and which specifically may enable communication with legacy devices.

In the example of FIG. 2, the power transmitter further comprises a second communicator 209 which is also arranged to communicate with the power receiver and specifically to receive messages/data from the power receiver where these are communicated using load modulation. However, in contrast to the first communicator 207, the second communicator 209 is arranged to communicate without the use of chip sequences and specifically is arranged to receive symbols transmitted from the power receiver by load modulation of the power transfer signal where a first binary symbol value being represented by no modulation load transition occurring within a symbol time and a second binary symbol value being represented by a single modulation load transition occurring within a symbol time. Thus, for the second communicator 209, each symbol may be a binary symbol which is determined by whether a transition of the modulation load occurs within a symbol time period (typically close to the center time) or not. For example, a load component (capacitor or resistor) may be switched in or out to change the load midway through the bit time period or may be kept unchanged depending on the data bit being transmitted and the second communicator 209 may be arranged whether such a load transition occurs or not.

Similarly, the power receiver comprises a second power receiver communicator 511 which is arranged to perform the corresponding load modulation, i.e. to apply, or not apply, a modulation load transition during the symbol time depending on the data value that is to be transmitted.

In many embodiments, the system may for such an approach also include a modulation load change at symbol/bit time transitions, i.e. when a new symbol ends and/or begins. For example, a new bit being transmitted may be indicated by a change/transition in the modulation load. This load may be changed during the bit symbol depending on the data being transmitted. Thus, the second power receiver communicator 511 may change the modulation load during the bit symbol when e.g. transmitting a "0" but not when e.g. transmitting a "1". The first communicator 207 may when detecting the modulation transition at the start of the bit duration start a time and if no further transition is detected within a given time interval, a "1" may be considered to have been transmitted and otherwise a "0" may be considered to have been transmitted.

The second communicator 209 may thus employ a load modulation approach that is backwards compatible and which for example may directly correspond to load modulation as is currently employed in e.g. Qi power transfer systems. Qi system use a biphase modulation method approach, with a "0" being represented by a single transition (at the start of the symbol time), and a "1" by two transitions (one at the start and one at the center of the symbol time).

It will be appreciated that whereas the second communicator 209 and the second power receiver communicator 511 are illustrated as separate communicators, they may typically share much functionality with respectively the first communicator 207 and the first power receiver communicator 509 and may often be implemented as a second mode of operation for the shared communication functionality.

In many embodiments, the power receiver and power transmitter may be arranged to perform parallel communication using both the first communicator and the second communicator. Thus, two communication channels may effectively be established with both being used for communication of data from the power receiver to the power transmitter.

The exact selection of which data is communicated using which communication channel may depend on the specific embodiment.

In some embodiments, for example, all data communication defined by the legacy specifications (such as e.g. conventional Qi Specifications) may be communicated using the second communication channel (formed by the second communicator 209 and the second power receiver communicator 511), i.e. using conventional communication. However, newer, additional functions introduced after the introduction of the communication approach described above may be supported by communication using the first communication channel (formed by the first communicator 207 and the first power receiver communicator 511). In such an approach, the second communication channel may thus support legacy communication and functionality allowing for the power transmitter/power receiver to be used with complementary legacy devices while allowing the first communication channel to provide additional and improved communication functionality for newer devices.

Thus, in some embodiments, both communications channels may be operated at the same time.

For example, the power receiver can use an existing Qi load modulation method implemented by the second communicators to run existing protocols. In addition, the new approach can be used to provide additional communications (e.g. with some appropriate synchronization between the two).

Similarly, a legacy power transmitter can use the existing Qi communications and protocol, while being impervious to the possible existence of the new channel whereas a newer power transmitter may be able to demodulate either or both channels. In some embodiments, the two channels may include the same information, and a suitably equipped power transmitter can select to use either one, e.g. depending on the quality of the communications. Alternatively, it can use the data of the new channels as supplemental information.

A power receiver being able to use both communications channels simultaneously may e.g. remove the need for a negotiation to determine whether the devices are capable of supporting the new communication. For example, if the power transmitter responds to a communication using the first communication channel, this indicates to the power receiver that the power transmitter is a newer power transmitter capable of supporting communication using the first communication channel. It may then e.g. stop using the second communication channel and proceed to only communicate using the described chip sequence approach.

In some embodiments, an initialization process may be performed to initiate the chip sequence based communication. Such an initialization approach may include a determination of whether both devices can support such communication.

In some embodiments, the power transmitter may for example initiate communication with the power receiver using the second communication channel. It may specifically transmit a message indicating that it can support chip sequence based communication and request that the power receiver indicates whether it also has capability to support chip sequence based communication. The power receiver may in response transmit a confirmation message that confirms the capability of the power receiver to communicate using chip sequence based communication. In response to receiving this message, the power transmitter may proceed to communicate using the first communication channel (instead of or possibly in parallel to communicating using the second communication channel).

In some embodiments, backwards compatibility with an single value load modulation approach of an existing communication (such as e.g. used in Qi), communication may start with legacy communication. During negotiation between the power receiver and the power transmitter, for example, before entering the power transfer phase, both devices may indicate their capabilities to support the chip sequence based communication, and one of the sides (power receiver or transmitter) may request the other device to switch to the chip sequence based communication using e.g. either pre-programmed or negotiated parameters.

In another example, the power receiver may use chip sequence based communication before using the existing load modulation approach (using default parameters). If the power transmitter recognizes the chip sequence based communication, it can acknowledge the message and it does not need to perform any receiving of the legacy communication from the power receiver. Such an approach may be particularly suitable for scenarios in which conventional load modulation will have too significant disadvantages, such as e.g. there being too much distortion to even support an initialization process.

In some embodiments, the parameters of the chip sequence based communication may be predetermined, e.g. the chip rate, chip sequence length, and/or the linking between data symbols and chip sequences may be predetermined and all power transmitters and power receivers supporting chip sequence based communication may be arranged to use the same parameters.

In other embodiments, the parameters may be adaptable and may e.g. be determined during an initialization or negotiation phase. For example, an initialization and/or negotiation phase may be started using default parameters—or e.g. using the second communication channel. During this phase, the power transmitter and the power receiver determine suitable parameters to use, e.g. by the power receiver suggesting suitable values for chip rate, chip sequence length, and/or the linking between data symbols and chip sequences. The power transmitter may then acknowledge these parameters and the chip sequence based communication may proceed using the agreed parameters. Thus, in such an example, the power transmitter and/or power receiver may be arranged to initiate communication with the power receiver using a default chip frequency/chip sequence length for the load modulation and may then to change the chip frequency/chip sequence in response to one or more messages received from the power receiver.

The wireless power transfer system might implement the use of chip sequence based communication as a single approach for load modulation and load modulation detection with e.g. the power transmitter and the power receiver having pre-programmed e.g.:

Chip Sequences (e.g. polynomial and sequence order to generate the sequence)

Number of chips per symbol

Apart from a higher-level protocol, these parameters are sufficient for both devices to communicate with each other. To enable optimization of the robustness and throughput of the channel, either or both of the parameters, may be renegotiated and applied to the system after initial communications have been established. For example, if both sides support a higher throughput, they can negotiate shorter length sequences.

A modulation load may be a load component of the loading of the power transfer signal/drive signal caused by/depending on/varying with the load modulation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to “a”, “an”, “first”, “second” etc. do not preclude a plurality. Reference signs in the claims are provided merely as a clarifying example shall not be construed as limiting the scope of the claims in any way.

Generally, examples of a power transmitter, power receiver, power transfer system, and methods therefor are indicated by below embodiments.

EMBODIMENTS

First Embodiment: A power transmitter (101) for wirelessly providing power to a power receiver (105) via an inductive power transfer signal; the power transmitter (101) comprising:

- an output circuit (203, 103) comprising a transmitter coil (103) arranged to generate the power transfer signal in response to a drive signal being applied to the output circuit (203, 103);
- a driver (201) arranged to generate the drive signal;
- a first communicator (207) arranged to receive symbols transmitted from the power receiver (105) by load modulation of the power transfer signal, each symbol being represented by a chip sequence being a sequence of modulation load values;
- the first communicator (207) comprising:
- a store (805) arranged to store a set of reference chip sequences, each reference chip sequence being linked with a data symbol;
- a correlator (803) arranged to correlate a first chip sequence received from the power receiver with the set of reference chip sequences;
- a demodulator (807) arranged to determine a received data symbol as the data symbol linked to a reference chip sequence for which a highest correlation with the first chip sequence is determined.

Second Embodiment: The power transmitter of claim 1 wherein the first communicator (207) comprises a sampler (801) arranged to sample a signal of the output circuit (203, 103) and the correlator (803) is arranged to determine sample modulation load values from samples of the signal and to determine correlation values for the set of reference chip sequences by correlating sample modulation load values to the reference chip sequences of the set of reference chip sequences.

Third Embodiment: The power transmitter of claim 1 or 2 wherein the first communicator (207) is arranged to synchronize the sampling of the signal of the output circuit (203, 103) to the power transfer signal.

Fourth Embodiment: The power transmitter of any previous claim wherein a sampling rate of the sampling of the signal of the output circuit (203, 103) is equal to a chip frequency of the load modulation.

Fifth Embodiment: The power transmitter of any previous claim wherein an operating frequency of the power transfer signal is an integer multiple of a sampling rate of the sampling of the signal of the output circuit (203, 103).

Sixth Embodiment: The power transmitter of any previous claim wherein an operating frequency of the power transfer signal is an integer multiple of a chip frequency of the load modulation.

Seventh Embodiment: The power transmitter of any previous claim further comprising a second a communicator (209) arranged to receive symbols transmitted from the power receiver (105) by load modulation of the power transfer signal with a first binary symbol value being represented by no modulation load transition occurring within a symbol time and a second binary symbol value being represented by a single modulation load transition occurring within the symbol time; and wherein the power transmitter (101) is arranged to initiate communication with the power receiver (105) using the second communicator (209) and to switch to the first communicator (207) in response to receiving a confirmation message from the power receiver (105), the confirmation message confirming a capability of the power receiver (105) to communicate symbols by load modulation where each symbol is represented by a chip sequence.

Eighth Embodiment: The power transmitter of any previous claim 1-6 further comprising a second communicator (209) arranged to receive symbols transmitted from the power receiver (105) by load modulation of the power transfer signal with a first binary symbol value being represented by no modulation load transition occurring within a symbol time and a second binary symbol value being represented by a single modulation load transition occurring within the symbol time; and wherein the power transmitter (101) is arranged to initiate communication with the power receiver (105) using the first communicator (207) and to switch to communication with the power receiver (105) using the second communicator (209) in the absence of receiving a confirmation message from the power receiver (105) using the first communicator (207).

Ninth Embodiment: The power transmitter of any previous claim 1-6 further comprising a second communicator (209) arranged to receive symbols transmitted from the power receiver (105) by load modulation of the power transfer signal with a first binary symbol value being represented by no modulation load transition occurring within a symbol time and a second binary symbol value being represented by a single modulation load transition occurring within the symbol time; and wherein the power transmitter (101) is arranged to perform parallel communication with the power receiver (105) using both the first communicator (207) and the second communicator (209).

Tenth Embodiment: The power transmitter of any previous claim wherein the set of reference chip sequences comprises more than two reference chip sequences.

Eleven Embodiment: A power receiver (105) for wirelessly receiving power from a power transmitter (101) via an inductive power transfer signal; the power receiver (105) comprising:

an input circuit (107, 503) comprising a receiver coil (107) arranged to extract power from the power transfer signal; and a communicator (509) arranged to transmit symbols to the power transmitter (101) by load modulation of the power transfer signal, each symbol being represented by a chip sequence being a sequence of modulation load values;

the communicator (509) comprising:

a receiver (601) arranged to receive a first data symbol to be transmitted;

a determiner (603) arranged to determine a first chip sequence assigned for the first data symbol;

a load modulator (605) arranged to load modulate the first chip sequence on the power transfer signal.

Twelfth Embodiment: The power receiver of claim 11 wherein the communicator (509) is arranged to synchronize the load modulation of the first chip sequence to the power transfer signal.

Thirteenth Embodiment: A method of operation for a power transmitter (101) for wirelessly providing power to a power receiver (105) via an inductive power transfer signal; the power transmitter (101) comprising:

an output circuit (203, 103) comprising a transmitter coil (103) arranged to generate the power transfer signal in response to a drive signal being applied to the output circuit (203, 103); and a first communicator (207) arranged to receive symbols transmitted from the power receiver (105) by load modulation of the power transfer signal, each symbol being represented by a chip sequence being a sequence of modulation load values; the method comprising:

generating the drive signal;

storing a set of reference chip sequences, each reference chip sequence being linked with a data symbol;

correlating a first chip sequence received from the power receiver with the set of reference chip sequences;

determining a received data symbol as the data symbol linked to a reference chip sequence for which a highest correlation with the first chip sequence is determined.

Fourteenth Embodiment: A method of operation for a power receiver (105) for wirelessly receiving power from a power transmitter (101) via an inductive power transfer signal; the power receiver (105) comprising:

an input circuit (107, 503) comprising a receiver coil (107) arranged to extract power from the power transfer signal; and a communicator (509) arranged to transmit symbols to the power transmitter (101) by load modulation of the power transfer signal, each symbol being represented by a chip sequence being a sequence of modulation load values;

the method comprising:

receiving a first data symbol to be transmitted;

determining a first chip sequence assigned for the first data symbol;

load modulating the first chip sequence on the power transfer signal.

Fifteenth Embodiment: A wireless power transfer system comprising a power transmitter (101) according to any of the previous claims 1 to 10 and a power receiver (105) according to any of claims 11 and 12.

The invention claimed is:

1. A power transmitter comprising:

an output circuit comprising a transmitter coil, wherein the transmitter coil is arranged to generate a power transfer signal in response to a drive signal applied to the output circuit;

a driver circuit, wherein the driver circuit is arranged to generate the drive signal;

a first communicator circuit comprising:

a memory circuit, wherein the memory circuit is arranged to store a plurality of reference chip sequences, wherein each reference chip sequence is linked to a data symbol;

a correlator circuit, wherein the correlator circuit is arranged to correlate a first chip sequence received from the power receiver with the plurality of reference chip sequences; and a demodulator circuit, wherein the first communicator circuit is arranged to receive symbols, wherein the symbols are transmitted from a power receiver by load modulation of the power transfer signal, wherein each symbol is represented by a chip sequence, wherein the chip sequence is a sequence of modulation load values, wherein each symbol is synchronized with the power transfer signal;

wherein the demodulator circuit is arranged to determine a first received data symbol as a data symbol linked to a reference chip sequence with a highest correlation with the first chip sequence.

2. The power transmitter of claim 1, wherein the first communicator circuit comprises a sampler circuit, wherein the sampler circuit is arranged to perform a sampling of a signal, wherein the correlator circuit is arranged to determine sample modulation load values from samples of the signal of the output circuit, wherein the correlator circuit is arranged to determine correlation values for the plurality of reference chip sequences by correlating sample modulation load values to the reference chip sequences of the plurality of reference chip sequences.

3. The power transmitter of claim 1, wherein the first communicator circuit is arranged to synchronize a sampling of a signal to the power transfer signal.

4. The power transmitter of claim 3, wherein a sampling rate of the sampling is equal to a chip frequency of the load modulation.

5. The power transmitter of claim 3, wherein an operating frequency of the power transfer signal is an integer multiple of a sampling rate of the sampling.

6. The power transmitter of claim 1, wherein an operating frequency of the power transfer signal is an integer multiple of a chip frequency of the load modulation.

7. The power transmitter of claim 1, further comprising a second communicator circuit, wherein the second communicator circuit is arranged to receive symbols, wherein the symbols are transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to initiate communication with the power receiver using the second communicator, wherein the power transmitter is arranged to switch to the first communicator circuit in response to receiving a confirmation message from the power receiver, wherein the confirmation message indicates a capability of the power receiver to communicate symbols by load modulation, wherein each symbol is represented by a chip sequence.

8. The power transmitter of claim 1, further comprising a second communicator, wherein the second communicator is arranged to receive symbols transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to initiate communication with the power receiver using the first communicator circuit, wherein the power transmitter is arranged to switch to communication with the power receiver using the second communicator in the absence of receiving a confirmation message from the power receiver using the first communicator circuit.

9. The power transmitter of claim 1, further comprising a second communicator, wherein the second communicator is arranged to receive symbols transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to perform parallel communication with the power receiver using both the first communicator circuit and the second communicator.

10. The power transmitter of claim 1, wherein the plurality of reference chip sequences comprises more than two reference chip sequences.

11. The power transmitter of claim 1, wherein the chip sequences are synchronized with the power transfer signal.

12. A power receiver comprising:

an input circuit comprising a receiver coil and a communicator circuit, wherein the receiver is arranged to extract power from a power transfer signal, wherein the communicator comprises:

a receiver circuit, wherein the receiver circuit is arranged to receive a first data symbol;

a determiner circuit, wherein the receiver circuit is arranged to determine a first chip sequence for the first data symbol; and a load modulator circuit, wherein the load modulator circuit is arranged to load modulate the first chip sequence on the power transfer signal, wherein the communicator circuit is arranged to synchronize the load modulation of the first chip sequence to the power transfer signal, wherein the communicator circuit is arranged to transmit symbols to a power transmitter by load modulation of the power transfer signal, wherein each symbol is represented by a chip sequence, wherein the chip sequence is a sequence of modulation load values wherein a sampling rate is equal to a chip frequency of the load modulation.

13. The power receiver of claim 12, wherein an operating frequency of the power transfer signal is an integer multiple of a sampling rate.

14. The power receiver of claim 12, wherein an operating frequency of the power transfer signal is an integer multiple of a chip frequency of the load modulation.

15. The power receiver of claim 12, wherein symbols are transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to initiate communication with the power receiver, wherein the power transmitter is arranged to switch communicator circuits in response to receiving a confirmation message from the power receiver, wherein the confirmation message indicates a capability of the power receiver to communicate symbols by load modulation, wherein each symbol is represented by a chip sequence.

16. The power receiver of claim 12, wherein symbols are transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to initiate communication with the power receiver, wherein the power transmitter is arranged to switch to communication with the power receiver using a second communicator in the absence of receiving a confirmation message from the power receiver using a first communicator circuit.

17. The power receiver of claim 12, wherein symbols are transmitted from the power receiver by load modulation of the power transfer signal, wherein a first binary symbol value is represented by no modulation load transition occurring within a symbol time, wherein a second binary symbol value is represented by a single modulation load transition occurring within the symbol time, wherein the power transmitter is arranged to perform parallel communication with the power receiver using both a first communicator circuit and a second communicator.

18. The power receiver of claim 12, wherein the plurality of reference chip sequences comprises more than two reference chip sequences.

19. The power receiver of claim 12, wherein the chip sequences are synchronized with the power transfer signal.

20. A method comprising:

generating a power transfer signal in response to a drive signal applied to an output circuit;

receiving symbols transmitted from a power receiver using load modulation of the power wherein each symbol is represented by a chip sequence, wherein each chip sequence is a sequence of modulation load values, wherein each symbol is synchronized with the power transfer signal;

generating the drive signal;

storing a plurality of reference chip sequences, wherein each reference chip sequence is linked to a data symbol;

correlating a first chip sequence received from the power receiver with the plurality of reference chip sequences; and determining a received data symbol as the data symbol linked to a reference chip sequence with a highest correlation with the first chip sequence.

21. The method of claim 20, further comprising, synchronizing a sampling of a signal to the power transfer signal.

22. The method of claim 21, wherein a sampling rate of the sampling is equal to a chip frequency of the load modulation.

23. The method of claim 20, wherein the chip sequences are synchronized with the power transfer signal.

24. The method of claim 20, further comprising:

determining sample modulation load values from samples of the signal of the output circuit; and determining correlation values for the plurality of reference chip sequences by correlating sample modulation load values to the reference chip sequences of the plurality of reference chip sequences.

25. A computer program stored on a non-transitory medium, wherein the computer program when executed on a processor performs the method as claimed in claim 20.

26. A method comprising:

extracting power from a power transfer signal;

transmitting symbols to a power transmitter load modulation of the power transfer signal, wherein each symbol is represented by a chip sequence, wherein the chip sequence is a sequence of modulation load values;

receiving a first data symbol;

determining a first chip sequence assigned for the first data symbol;

modulating the first chip sequence on the power transfer signal; and synchronizing the load modulation of the first chip sequence to the power transfer signal.

27. The method of claim 26, further comprising:

determining sample modulation load values from samples of the signal of the output circuit; and determining correlation values for the plurality of reference chip sequences by correlating sample modulation load values to the reference chip sequences of the plurality of reference chip sequences.

28. The method of claim 26, further comprising, synchronizing a sampling of a signal to the power transfer signal.

29. The method of claim 28, wherein a sampling rate of the sampling is equal to a chip frequency of the load modulation.

30. The method of claim 26, wherein the chip sequences are synchronized with the power transfer signal.

31. A computer program stored on a non-transitory medium, wherein the computer program when executed on a processor performs the method as claimed in claim 26.

* * * * *